United States Patent
Nakata

(10) Patent No.: US 9,300,837 B2
(45) Date of Patent: Mar. 29, 2016

(54) INFORMATION PROCESSING APPARATUS, INFORMATION PROCESSING METHOD, AND STORAGE MEDIUM FOR IDENTIFIABLE INFORMATION ABOUT PRINT JOBS

(71) Applicant: CANON KABUSHIKI KAISHA, Tokyo (JP)

(72) Inventor: Hiroaki Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/203,290

(22) Filed: Mar. 10, 2014

(65) Prior Publication Data

US 2014/0268227 A1 Sep. 18, 2014

(30) Foreign Application Priority Data

Mar. 13, 2013 (JP) .................. 2013-050060

(51) Int. Cl.
  *G06F 3/12* (2006.01)
  *H04N 1/32* (2006.01)
  *H04N 1/00* (2006.01)

(52) U.S. Cl.
  CPC .......... *H04N 1/32101* (2013.01); *G06F 3/1205* (2013.01); *G06F 3/1262* (2013.01); *G06F 3/1286* (2013.01); *H04N 1/00233* (2013.01); *H04N 1/00957* (2013.01); *G06F 3/1242* (2013.01); *H04N 2201/3216* (2013.01); *H04N 2201/3222* (2013.01); *H04N 2201/3226* (2013.01); *H04N 2201/3228* (2013.01); *H04N 2201/3273* (2013.01)

(58) Field of Classification Search
  CPC .................. H04N 1/32101; H04N 2201/3205; H04N 2201/3226; H04N 1/00233; H04N 1/00957; G06F 3/1262; G06F 3/1204; G06F 3/1246; G06F 3/1205; G06F 3/1286
  USPC ....................... 358/1.13, 1.15, 1.18
  See application file for complete search history.

(56) References Cited

U.S. PATENT DOCUMENTS

| 8,451,490 B2 * | 5/2013 | Sugiyama ................. 358/1.13 |
| 2006/0215202 A1 * | 9/2006 | Nakata et al. ............... 358/1.13 |
| 2008/0030772 A1 * | 2/2008 | Shirai ..................... 358/1.15 |
| 2010/0328704 A1 * | 12/2010 | Feng et al. ................. 358/1.15 |

FOREIGN PATENT DOCUMENTS

JP  2006-260243 A  9/2006

* cited by examiner

*Primary Examiner* — Benny Q Tieu
*Assistant Examiner* — Juan M Guillermety
(74) *Attorney, Agent, or Firm* — Canon USA, Inc. IP Division

(57) ABSTRACT

An information processing apparatus includes a display control unit and a generation unit. The display control unit displays a job selection screen which displays a plurality of print jobs. The generation unit generates a combined print job in which first and second print jobs selected by using the job selection screen are combined, wherein the display control unit displays, on the job selection screen, information about the combined print job identifiable of each file format of the first and second print jobs prior to be combined, based on information indicating the file format of the first print job and information indicating the file format of the second print job.

9 Claims, 17 Drawing Sheets

FIG. 6

| NUMBER | KEYWORD | POSITION |
|--------|---------|----------|
| 1 | http:// | HEAD |
| 2 | https:// | HEAD |
| 3 | .* | TAIL |
| | | |

FIG. 7

| KEYWORD | ICON |
|---------|------|
| http:// | H |
| https:// | H |
| .document | D |
| 401~.table | T ~402 |
| .slide | S |
| ... | ... |

FIG. 11

| DOCUMENT NAME | NUMBER OF PAGES | PRINTING METHOD | LAYOUT | STATUS |
|---|---|---|---|---|
| COMBINED DOCUMENT 1 | 30 | ONE-SIDED PRINTING | 1 in 1 | |
| MINUTES.document | 4 | ONE-SIDED PRINTING | 1 in 1 | |

FIG. 12

| DOCUMENT NAME | NUMBER OF PAGES | PRINTING METHOD | LAYOUT | STATUS |
|---|---|---|---|---|
| ATTENDEE LIST+PRESENTATION MATERIAL | 1+29 | ONE-SIDED PRINTING | 1 in1 | |
| MINUTES.document | 4 | ONE-SIDED PRINTING | 1 in1 | |

FIG. 14

| NUMBER | FILE NAME |
|--------|-----------|
| 1 | PRESENTATION MATERIAL.slide |
| 2 | IMAGE10.jpeg |
| 3 | ATTENDEE LIST.table |
| 4 | IMAGE1.jpeg |
| ... | ... |

FIG. 16

```xml
<?xml version="1.0" encoding="UTF-8"?>
<psf:PrintTicket xmlns:psf="http://schemas.microsoft.com/windows/2003/08/printing/
printschemaframework" xmlns:xsi="http://www.w3.org/2001/XMLSchema-instance"
xmlns:xsd="http://www.w3.org/2001/XMLSchema" version="1" xmlns:ns0000="http://
www.ihv.com/ns/printschema/v100" xmlns:psk="http://schemas.microsoft.com/windows/
2003/08/printing/printschemakeywords">
  <psf:Feature name="psk:PageMediaSize">
    <psf:Option name="psk:ISOA4">
      <psf:ScoredProperty name="psk:MediaSizeWidth">
        <psf:Value xsi:type="xsd:integer">210000</psf:Value>
      </psf:ScoredProperty>
      <psf:ScoredProperty name="psk:MediaSizeHeight">
        <psf:Value xsi:type="xsd:integer">297000</psf:Value>
      </psf:ScoredProperty>
    </psf:Option>
  </psf:Feature>
  <psf:Feature name="psk:JobInputBin">
    <psf:Option name="psk:AutoSelect">
    </psf:Option>
  </psf:Feature>
  <psf:Feature name="psk:PageOrientation">
    <psf:Option name="psk:Portrait">
    </psf:Option>
  </psf:Feature>
  <psf:Feature name="psk:JobDuplexAllDocumentsContiguously">
    <psf:Option name="psk:TwoSidedLongEdge">
    </psf:Option>
  </psf:Feature>
  <psf:Property name="ns0000:ProcessName">
    <psf:Value xsi:type="xsd:string">C:¥Program Files¥Mail¥Mail.exe</psf:Value>
  </psf:Property>
</psf:PrintTicket>
```

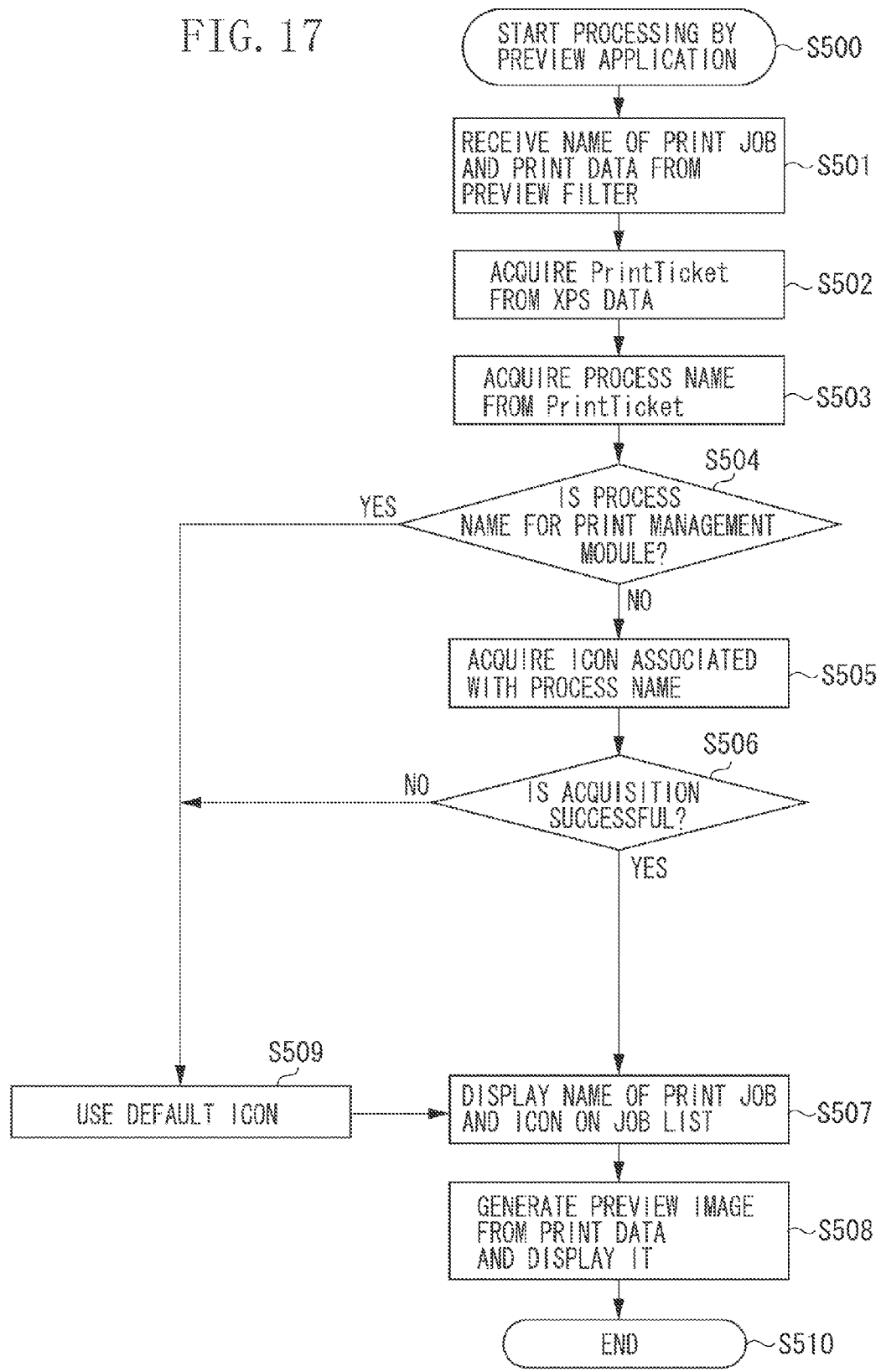

INFORMATION PROCESSING APPARATUS, INFORMATION PROCESSING METHOD, AND STORAGE MEDIUM FOR IDENTIFIABLE INFORMATION ABOUT PRINT JOBS

BACKGROUND OF THE INVENTION

1. Field of the Invention

The present invention relates to an information processing apparatus, an information processing method, and a storage medium.

2. Description of the Related Art

Japanese Patent Application Laid-Open No. 2006-260243 discusses a technique in which a plurality of print jobs output from a printer driver is combined to generate a combined job.

However, in a conventional printing system, normal jobs yet-to-be-combined and the combined job are displayed as apparently the same items in a user interface of a job list.

SUMMARY OF THE INVENTION

The present invention is directed to performing display control whereby it is easy for a user to operate.

According to an aspect of the present invention, an information processing apparatus includes a display control unit and a generation unit. The display control unit displays a first job selection screen that presents a plurality of print jobs, including information about a first print job uncombined with information about a second print job. The generation unit generates a combined print job. In response the job selection screen receiving input to select and combine the first and second print jobs, the display control unit displays a second job selection screen in place of the first job selection screen such that information about the first and second print jobs is deleted and information about the combined print job is identifiably displayed in such a manner that the first and second print jobs are each identifiable to a user as part of the displayed combined print job.

Further features of the present invention will become apparent from the following description of exemplary embodiments with reference to the attached drawings.

BRIEF DESCRIPTION OF THE DRAWINGS

FIG. 6 illustrates an example of a data structure of a table used for extracting a keyword.

FIG. 7 illustrates an example of a data structure of a table indicating the association of a keyword with an icon.

FIG. 11 illustrates an example of the screen of the preview application.

FIG. 12 illustrates an example of the screen of the preview application.

FIG. 14 is an example of a data structure of a list of "recently used items."

FIG. 16 illustrates an example of data of a PrintTicket.

FIG. 17 is a flow chart illustrating an example of processing for displaying an icon.

DESCRIPTION OF THE EMBODIMENTS

Various exemplary embodiments, features, and aspects of the invention will be described in detail below with reference to the drawings.

Figure 1:
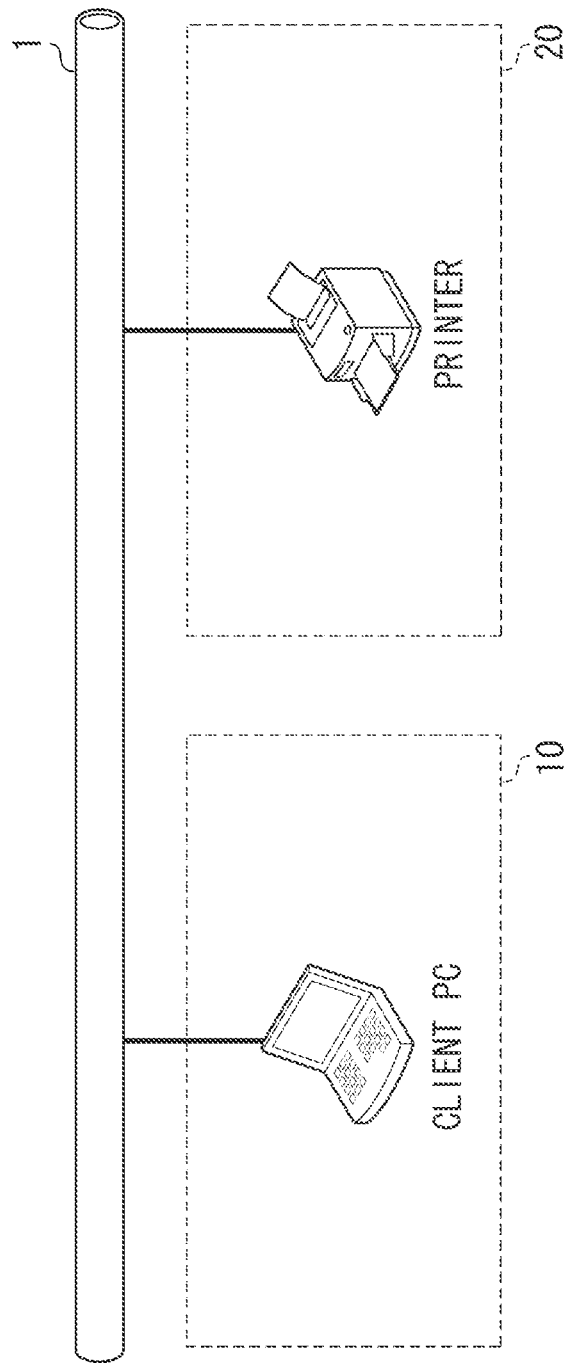
FIG. 1 illustrates an example of a configuration of a printing system.

FIG. 1 illustrates an example of a configuration of a printing system according to a first exemplary embodiment.

The printing system according to the present exemplary embodiment includes a client personal computer (PC) 10 and a printer 20. The client PC 10 is connected to the printer 20 via a local area network (LAN) 1. The client PC 10 is an example of an information processing apparatus.

The client PC 10 and the printer 20 may be connected with each other via other connection forms such as a universal serial bus (USB) and BlueTooth (registered trademark) as well as via the LAN 1.

Figure 2:
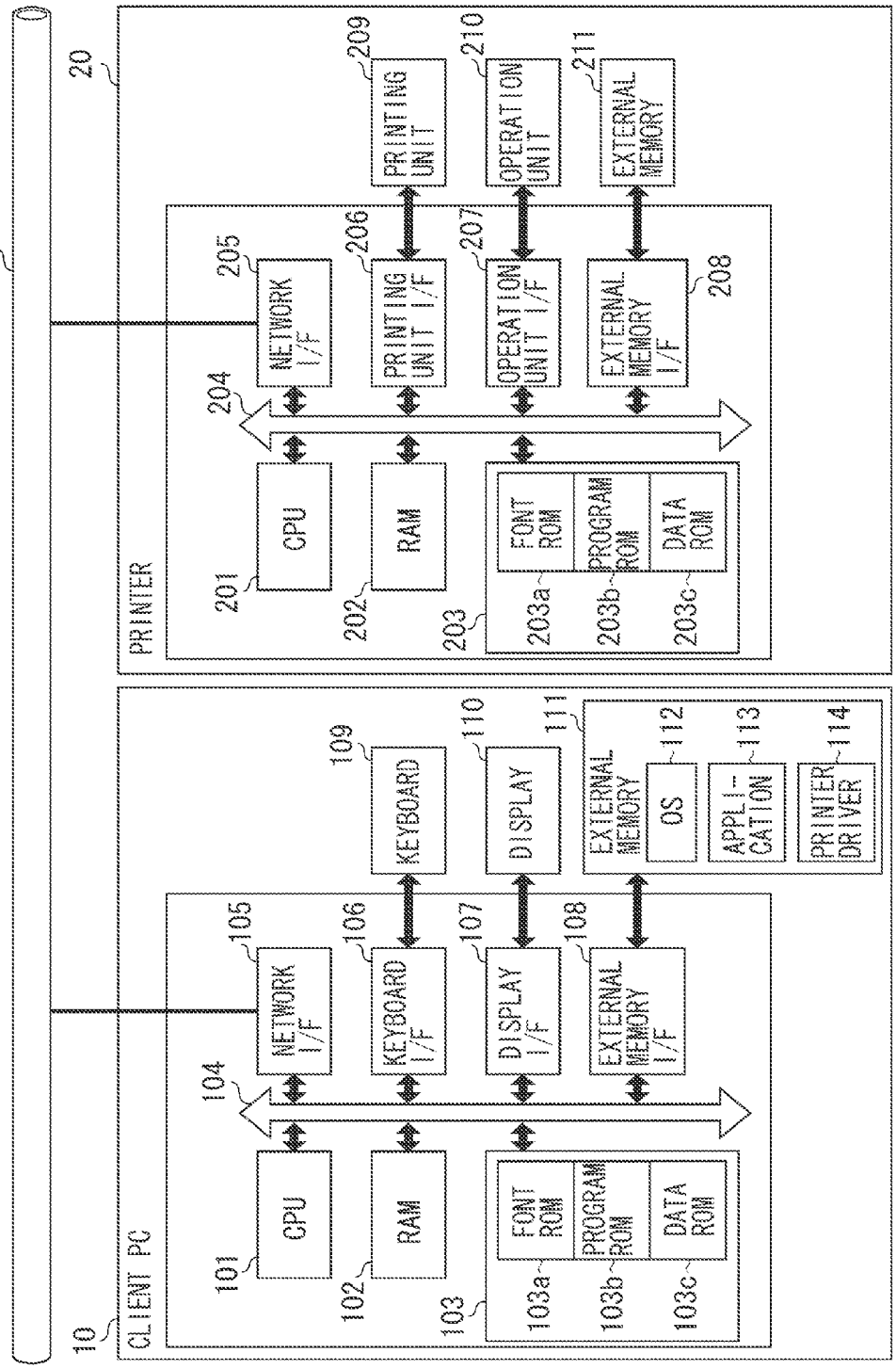
FIG. 2 illustrates an example of a hardware configuration of each apparatus.

FIG. 2 illustrates an example of a hardware configuration of each apparatus.

The client PC 10 according to the present exemplary embodiment is described below.

A central processing unit (CPU) 101 generally controls devices connected to a system bus 104 according to a program stored in a random access memory (RAM) 102.

The RAM 102 also functions as a main memory and a work area of the CPU 101.

A read only memory (ROM) 103 stores various programs and data and includes a font ROM 103a for storing various fonts, a program ROM 103b for storing a boot program and a basic input/output system (BIOS), and a data ROM 103c for storing various data.

A network interface (I/F) 105 is connected to the LAN 1 to perform communication processing.

A keyboard interface (I/F) 106 controls a key input from a keyboard 109 and a pointing device (mouse).

A display interface (I/F) 107 controls display processing for a display 110.

An external memory interface (I/F) 108 performs access control to an external memory 111 such as a hard disk (HD), for example.

The external memory 111 functions as a computer-readable storage medium, which stores programs for an operating system (hereinafter referred to as OS) 112, an application 113, and a printer driver 114.

The OS 112 is not limited to a specific type.

The CPU 101 executes processing based on the programs stored in the ROM 103 or the external memory 111 to realize the functions of the client PC 10 and processing related to a flow chart, as described below.

The configuration of the printer 20 is described below.

A CPU 201 generally controls the devices connected to a system bus 204 according to a program stored in a RAM 202. The RAM 202 functions as a main memory and a work area of the CPU 201 and is also used as an output information rasterizing area and an environmental data storing area.

The RAM 202 also includes a non-volatile (NV) RAM area and a memory capacity thereof can be expanded by an optional RAM connected to an expansion port.

A ROM 203 includes a font ROM 203a for storing various fonts, a program ROM 203b for storing a control program executed by the CPU 201, and a data ROM 203c for storing various data.

A network I/F 205 is connected to the LAN 1 to perform communication processing.

A printing unit I/F 206 controls an interface with a printing unit 209 as a printer engine.

An operation unit 210 controlled by an operation unit I/F 207 is provided with an operation panel for receiving an operation from a user, and switches and a light emitting diode (LED) display for an operation are provided on the operation panel.

An external memory I/F 208 performs access control to an external memory 211 such as a HD, for example.

The external memory 211 stores font data, an emulation program, and form data.

The external memories 211 may be provided one or more. A plurality of external memories 211 storing an option font card and a program for interpreting a printer control language different in language system, for example, may be provided in addition to a built-in font.

The CPU 201 can perform communication processing with the client PC 10 via the network I/F 205 and receives page description language (PDL) data transmitted from the client PC 10. The CPU 201 can output image data acquired by converting print data to the printing unit 209 via the printing unit I/F 206 based on the control program stored in the program ROM 203b of the ROM 203.

Figure 3:
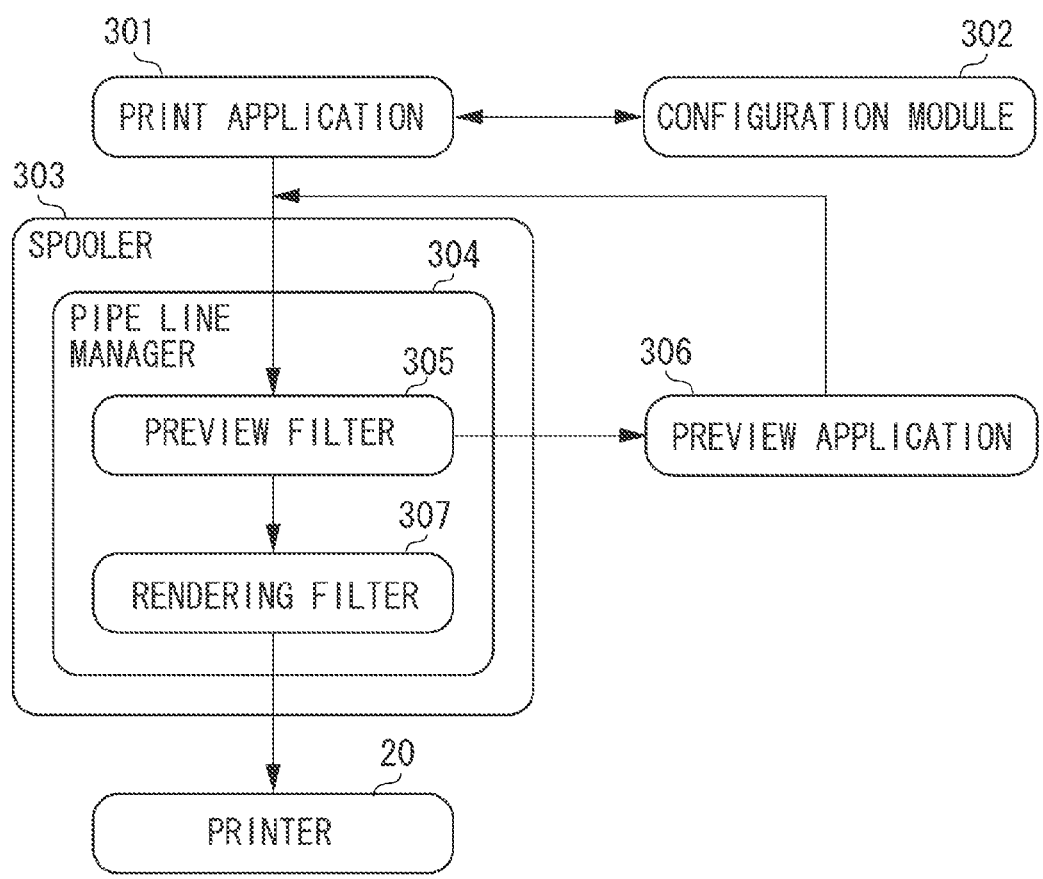
FIG. 3 illustrates an example of a configuration of software related to a printing system of a client PC.

FIG. 3 illustrates an example of a configuration of software related to the printing system of the client PC 10.

A print application 301 is used when the user generates a document to be printed and instructs printing.

A spooler 303 and a pipeline manager 304 receive a request for printing from the print application 301 as a print job and cause a printer driver 114 to process the print job.

In the present exemplary embodiment, the printer driver 114 conforms to an extensible markup language (XML) paper specification (XPS) driver system, for example.

The XPS driver is a printer driver using a PrintTicket format conforming to the Print Schema specification and an XPS format as print data.

A configuration module 302, a preview filter 305, a preview application 306, and a rendering filter 307 are software components configuring the printer driver 114.

The configuration module 302 performs processing such as the generation of default print setting data according to a request from the print application 301 or the resolution of a contradiction included in the default print setting data.

An input and an output of the configuration module 302 are performed in the PrintTicket format. The preview filter 305 is one of components called a series of "filters" for processing print data and activates the preview application 306 according to pint setting.

An input and an output of the preview filter 305 are performed in the XPS format.

The preview application 306 receives and temporarily stores print data in the XPS format output from the preview filter and displays and reprints a print preview.

The rendering filter 307 generates PDL to be transmitted to the printer 20.

The rendering filter 307 inputs the XPS format data and outputs the PDL data.

Figure 4:
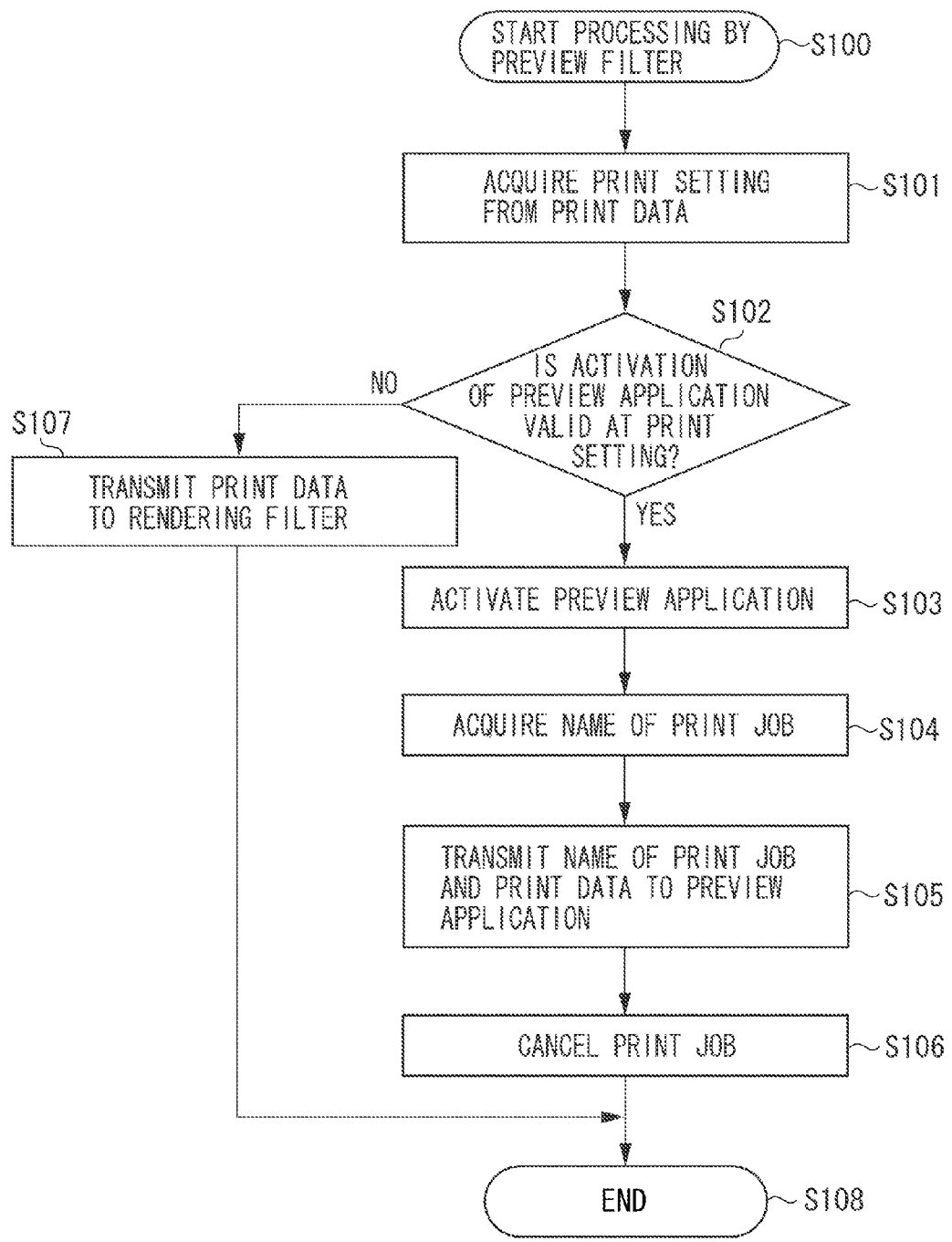
FIG. 4 is a flow chart illustrating processing of a preview filter.

FIG. 4 is a flow chart illustrating processing of the preview filter 305.

An activation process of the preview application 306 is described below with reference to the flow chart.

The user issues a print instruction via the print application 301. In step S100, the print data in the XPS format generated by the print application 301 is transmitted to the pipeline manager 304 in the spooler 303, and the pipeline manager 304 causes the preview filter 305 to start processing.

In step S101, the preview filter 305 acquires print setting information in the PrintTicket format from the print data in the XPS format.

The print setting information acquired in step S101 is the one that the print application 301 acquires from the configuration module 302 and embeds in the print data.

The user can input the print setting information via a user interface generated by the configuration module in advance of the print instruction.

In step S102, if the user sets the activation setting of the preview application 306 to be effective when inputting the print setting information (YES in step S102), the processing proceeds to step S103. In step S103, the preview application 306 is activated by the preview filter 305.

Whereas if the user sets the activation setting of the preview application 306 to be disabled (NO in step S102), the processing proceeds to step S107. In step S107, the preview application 306 is not activated and the input print data is transmitted as it is to the rendering filter 307.

In step S103, when the preview application 306 is activated, in step S104, the preview filter 305 acquires a job name from the pipeline manager 304. Then in step S105, the preview filter 305 transmits the job name and the print data to the preview application 306.

In step S106, after the transmission is completed, the preview filter 305 cancels the print job. In step S108, the processing is ended.

If the print data temporarily stored in the preview application 306 is reprinted as a new print job by a user's instruction, the activation setting of the preview application 306 is set to be disabled by the preview application 306.

Therefore, if the job transmitted once to the preview application 306 is reprinted, which is determined to be "NO" in step S102, in step S107, the print data is transmitted to the rendering filter 307 and printed.

Figure 5:
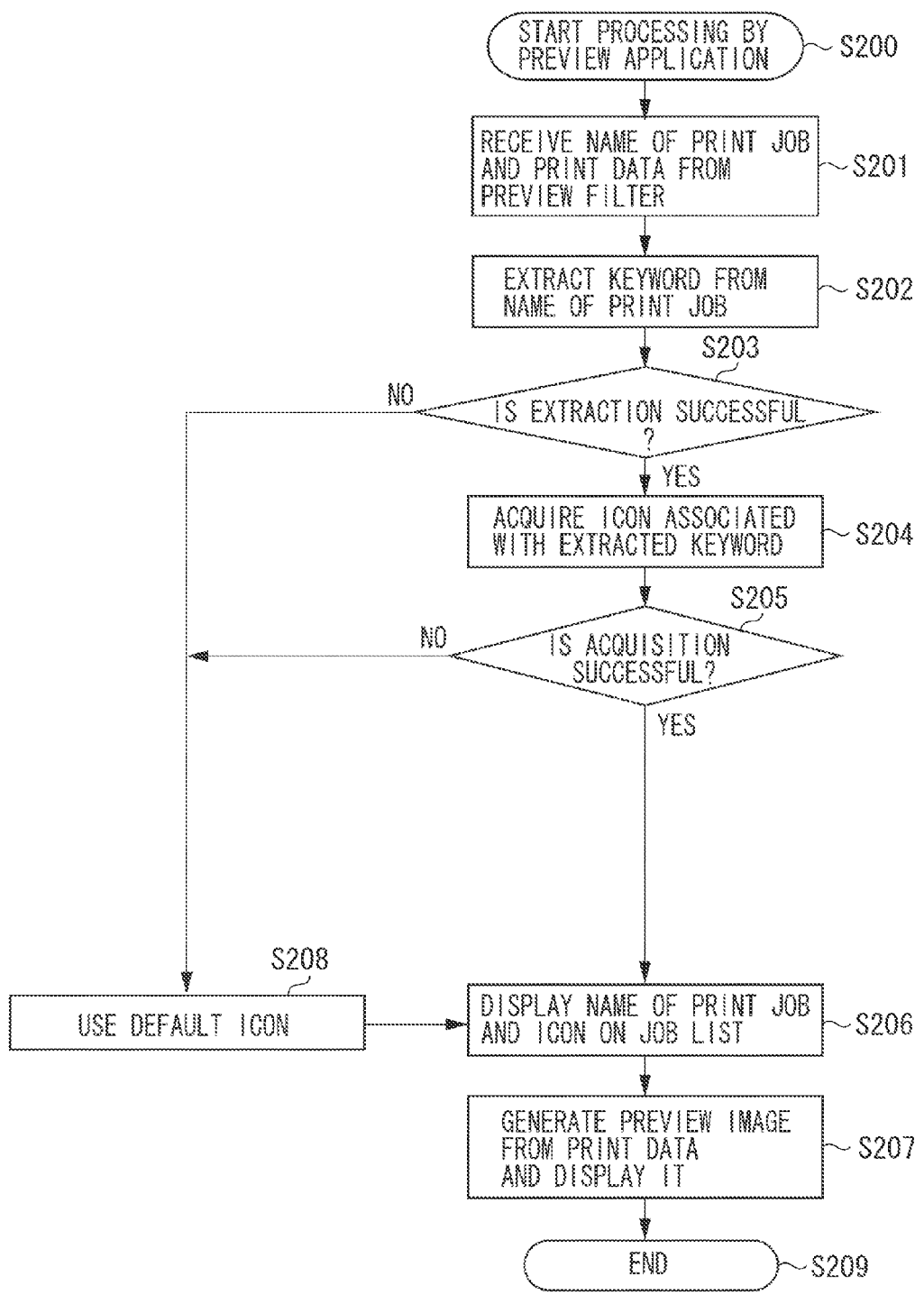
FIG. 5 is a flow chart illustrating processing of a preview application.

FIG. 5 is a flow chart illustrating processing of the preview application 306.

The flow chart illustrates a series of processing steps in which the preview application 306 is activated and then until the information about the print job is displayed in a job list.

In step S200, the preview application 306 is activated by the preview filter 305, and in step S201, the preview application 306 receives the job name and the print data from the preview filter 305.

In step S202, the preview application 306 extracts a keyword from the job name.

A method for extracting the keyword from the job name is described below with reference to FIG. 6.

FIG. 6 illustrates an example of a data structure of a table used for extracting the keyword.

The preview application 306 examines whether a keyword pattern indicated in the table matches a character string in a specified position of a character string of the job name. If there is a matching keyword pattern, the matching keyword is extracted.

The following description uses the job name of the "Attendee List.table."

The preview application 306 determines whether a character string of the keyword pattern "http://" specified in the number one, which is at the top of the table, matches a position "head."

The keyword pattern "http://" often intends to match the job name printed from an application, such as the Internet browser, however, in the present exemplary embodiment, "Attendee List.table" does not match the keyword pattern.

The "Attendee list.table" matches neither the number-two keyword pattern "https://" nor a position "head."

The "Attendee list.table" matches the number-three keyword pattern ".*" and a position "tail."

The keyword pattern is intended to match the extension when a file name is used as a job name. In the present exemplary embodiment, ".table" matches one of the keyword patterns and is extracted.

In the present exemplary embodiment, the extraction is successful, but a job name sometimes matches none of keyword patterns.

If the preview application 306 succeeds in extraction (YES in step S203), the processing proceeds to step S204. If the preview application 306 fails in extraction (NO in step S203), the processing proceeds to step S208.

In step S204, the preview application 306 acquires an icon associated with the keyword from the OS 112. The term icon refers to the one that makes, for example, contents of a file easily understandable using figures and pictures. The icon is an example of an object.

FIG. 7 illustrates an example of a data structure of a table indicating the association of a keyword with an icon.

The OS 112 provides an application program interface (API) used for accessing information in the table. A desired keyword is specified via the API to allow the preview application 306 to acquire the icon associated with the keyword.

In the present exemplary embodiment, a keyword of ".table" is specified to acquire an icon 402.

Although the icon is successfully acquired in the present exemplary embodiment, an icon associated with a keyword is sometimes not registered.

If the preview application 306 succeeds in acquiring the icon (YES in step S205), the processing proceeds to step S206. If the preview application 306 fails in acquiring the icon (NO in step S205), the processing proceeds to step S208.

In step S208, if the preview application 306 cannot extract the keyword or cannot acquire the icon, the preview application 306 acquires a default icon.

The data of the default icon is previously included in the preview application 306.

In step S206, the preview application 306 displays the job name and the determined icon on the job list. In step S207, the preview application 306 generates a preview image from the print data and displays the preview image. In step S209, the preview application 306 ends the processing.

Figure 8:
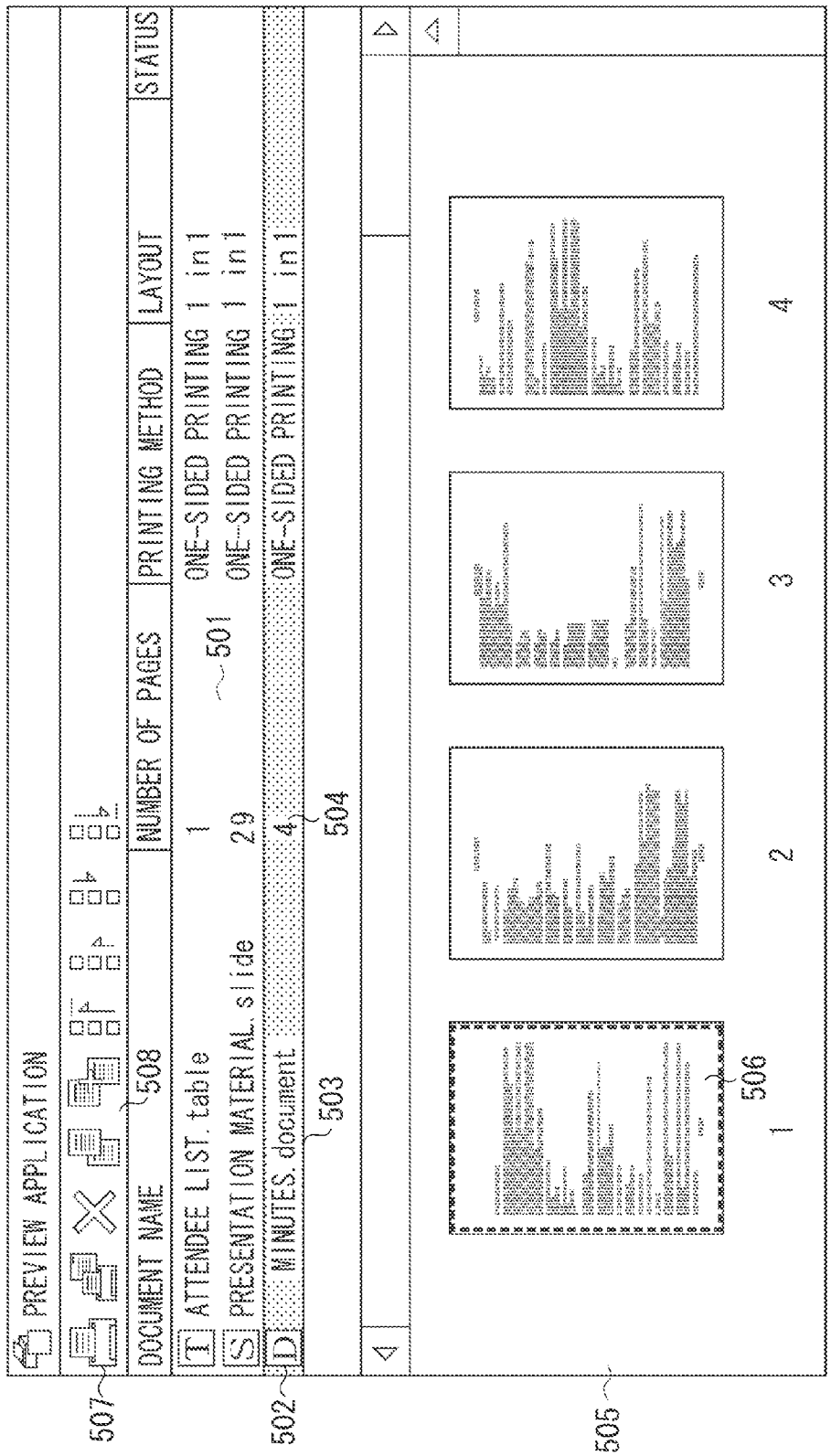
FIG. 8 illustrates an example of a screen of the preview application.

FIG. 8 illustrates an example of a screen of the preview application 306. Information about the received print job is displayed on a job list 501 as an item.

An icon 502, a job name 503, and Information about the number of pages 504 are displayed as items of the job list 501.

The preview image generated from the print data is displayed in an area 505. A preview image 506 is displayed in the area.

A button 507 is used for issuing instructions for print processing. A button 508 is used for issuing instructions for job combining processing.

In step S204, if the preview application 306 succeeds in acquiring the icon associated with the keyword extracted from the job name, the displayed icon 502 is the same as the program icon of the print application 301, which has issued instructions for printing.

The print job is represented not only by the job name, which is character information, but also by the icon, which is image information, to increase the visibility of the print job. Such an arrangement makes it easy to distinguish between the items, and therefore improves the work efficiency of the user.

In the example of the screen illustrated in FIG. 8, only a print job received from the preview filter 305 (hereinafter referred to as normal job) is displayed, however, the preview application 306 is also provided with a job combining function to combine the print jobs.

Figure 9:
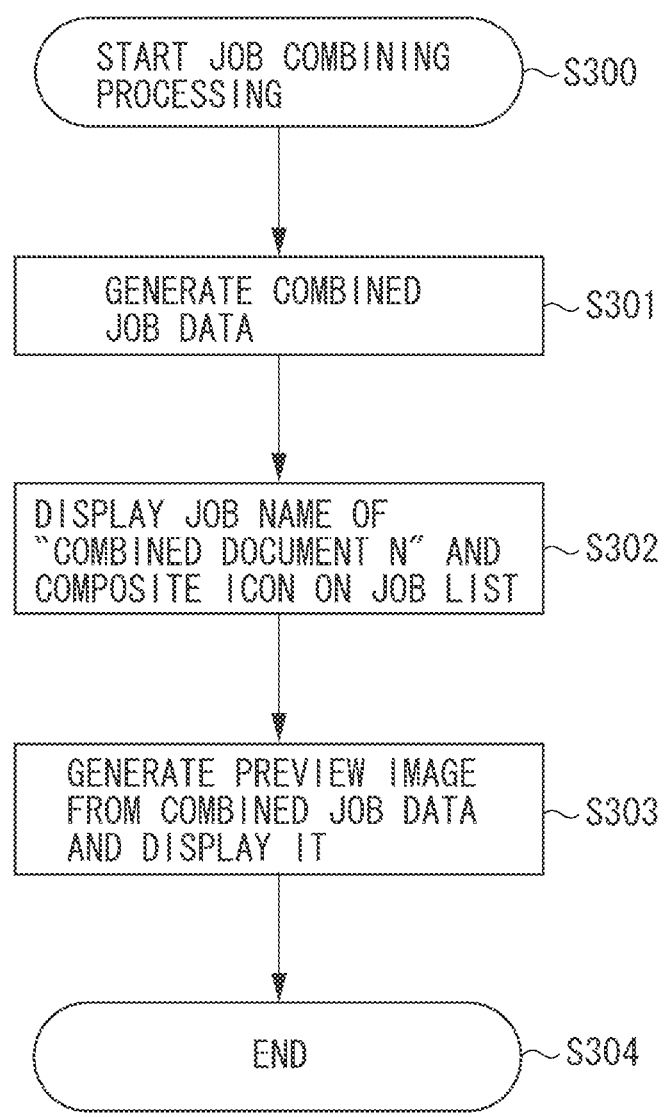
FIG. 9 is a flow chart illustrating processing for displaying items of a job list including a combined job.

A method for displaying items of the job list including the print job combined by the job combining function (hereinafter referred to combined job) is described below with reference to a flow chart illustrated in FIG. 9. The combined job is an example of a combined print job.

In step S300, if the button 508 is pressed, when a plurality of the normal jobs has been selected on the job list 501 of FIG. 8, job combining processing is started.

In step S301, the preview application 306 generates combined job data.

Figure 10:
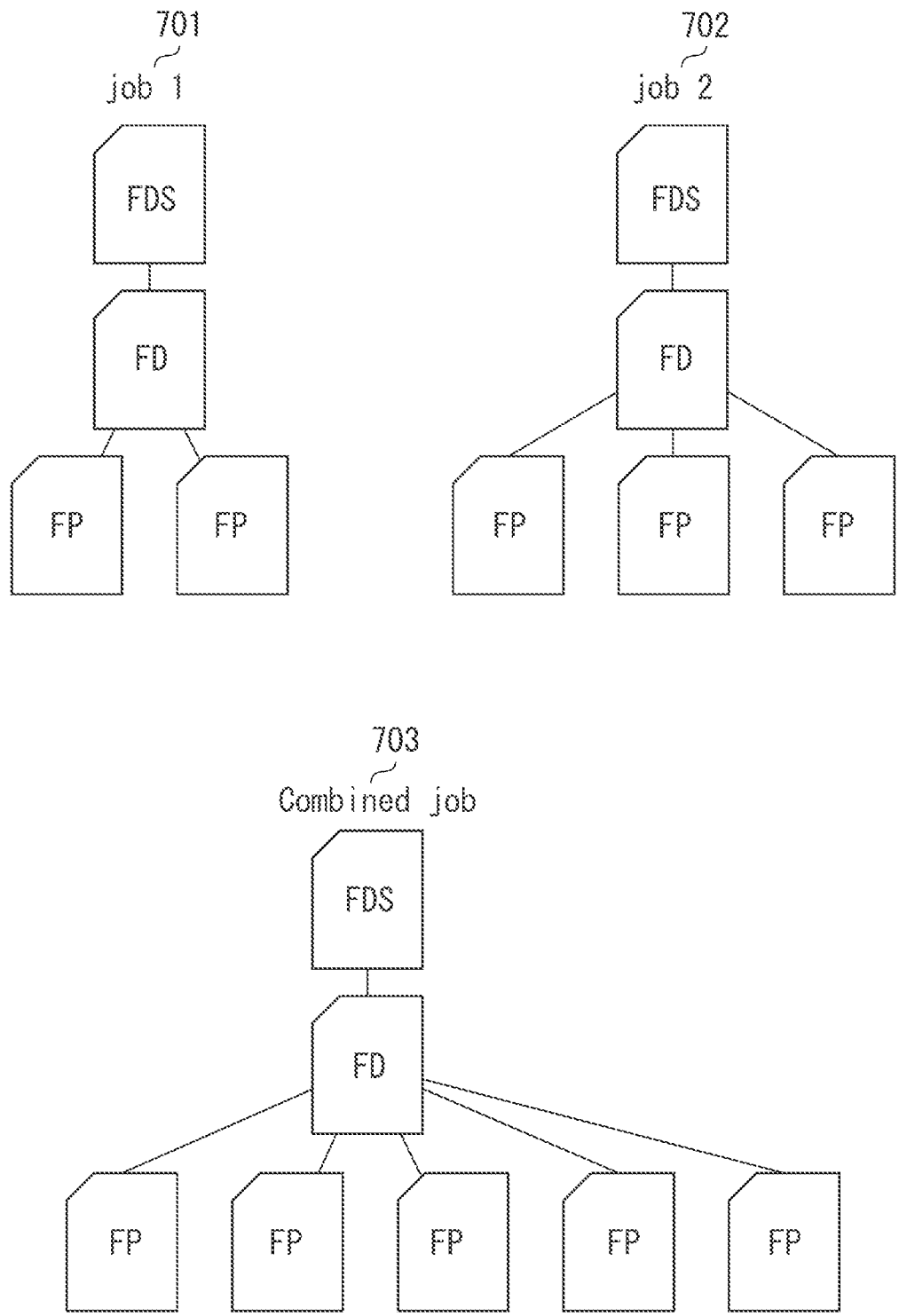
FIG. 10 illustrates examples of structures of normal job data and combined job data.

The structure of normal job data and combined job data is described below with reference to a schematic diagram illustrated in FIG. 10.

A job 1 701 is a first normal job to be combined. A job 2 702 is a second normal job to be combined. The job 1 is an example of a first print job. The job 2 is an example of a second print job. Furthermore, a combined job 703 is illustrated in FIG. 10.

XPS data includes three layers of a fixed document sequence (FDS), a fixed document (FD), and a fixed page (FP) representing a document structure.

The FP layer corresponds to pages. The FD layer corresponds to a document including a plurality of the FP layers. The FDS layer corresponds to a job including a plurality of the FD layers. In the XPS data, the FDS is the topmost layer, the FD is lower layer than the FDS, and the FP is lower layer than the FD.

There may be a plurality of FD in the XPS data, however, there must be a single FDS.

The preview application 306 combines a plurality of normal jobs (i.e., Job 1 and Job 2) and treats them as one combined job. For this reason, the preview application 306 combines the FP of Job 2 with the FD of Job 1 so that the top page of Job 2 follows the last page of Job 1 to generate the combined job.

In the present exemplary embodiment, the FP is coupled to the FD, however, the FD may be coupled to the FDS.

We return to the description of the flow chart illustrated in FIG. 9 again.

The preview application 306 displays "combined document N" (N is a numeric value) as a job name. The numeric value N indicates the n-th combined document. In step S302, the preview application 306 associates a composite icon with "combined document N" and displays it on the job list. The composite icon is generated by composing icons which are associated with the print jobs to be combined. The processing in step S302 is an example of display control processing.

In step S303, the preview application 306 generates a preview image from the data of the generated combined job and displays the preview image. In step S304, the job combining processing is ended.

FIG. 11 illustrates an example of the screen of the preview application 306 including a combined print job.

Icons 601 are displayed as an item of a combined job. A job name 602 is displayed as an item of the combined job. Information about the number of pages 603 is displayed as an item of the combined job. The icons 601 are displayed such that the two icons associated with the normal jobs which have been combined are arranged side by side and composed. The two icons 601 are examples of the first and second objects.

The icons are thus arranged side by side to allow the user to visually recognize that two normal jobs are combined to a combined job.

Furthermore, the icons arranged side by side allow the user to visually recognize that an original normal job configuring the combined job is printed by which application (the icons 601 are examples of spreadsheet software and a slide-show builder).

If three or more normal jobs are combined, the preview application 306 may compose all icons for the normal jobs and display them side by side or may indicate that three or more normal jobs are combined by adding an ellipsis such as "..." on the right side of two icons.

FIG. 12 illustrates another example of a screen of the preview application 306.

The preview application 306 displays not only a composite icon 801 but displays "attendee list+presentation material" as a job name 802 and "1+29" as the number of pages 803 by adding a plus sign between the two normal job information pieces, as composite information. Alternatively, the preview application 306 may compose the job names to satisfy the set number of characters in the composing processing and display it. The attendee list is an example of a first job name. The presentation material is an example of a second job name.

The user is thus notified of information of each normal job, which has been combined, to allow the user to more easily recognize which is the combined job.

As described above, in the first exemplary embodiment, the displaying method is described in which application icon data is acquired from the OS 112 and displayed by being associated with the job as the icon of the list item, based on the keyword included in the job name of the normal job.

For the combined job, the displaying method is described in which the icons associated with the normal jobs to be combined are arranged side by side and composed, and the composite icon is displayed as the icon of the list item.

As a result, the user can easily recognize the original print applications of normal jobs configuring the combined job.

In the first exemplary embodiment, the method in which the client PC 10 extracts a keyword from the job name of a print job and acquire an associated icon from the extracted keyword is described.

However, the job name is information arbitrarily specified by the print application 301, so that an expected keyword, such as an extension of a file name, is not necessarily included therein. In a second exemplary embodiment, following processing is described which is performed by the client PC 10 to acquire an icon associated with a print job even if the expected keyword is not included in the job name.

Figure 13:
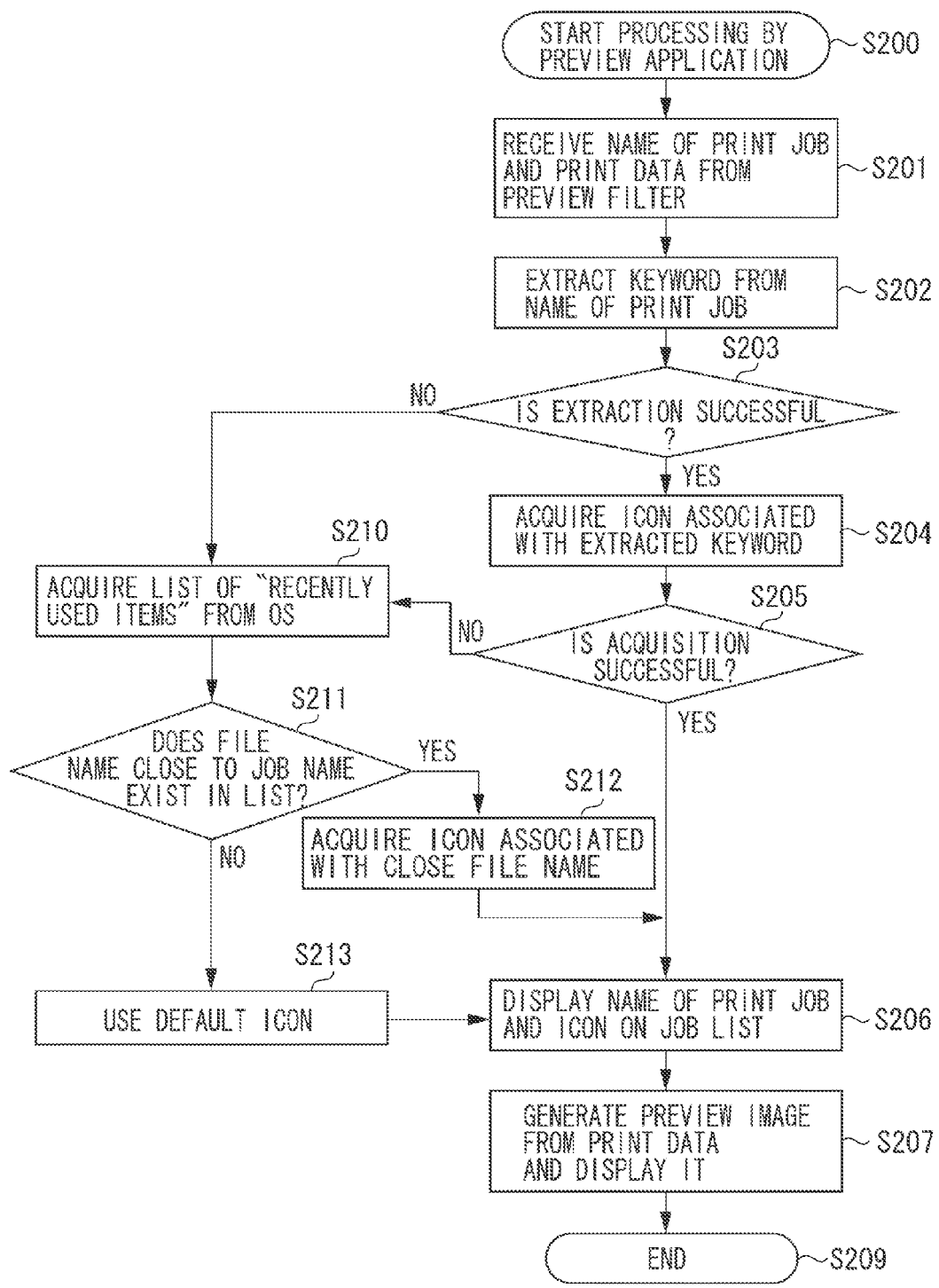
FIG. 13 is a flow chart illustrating job list display processing of the preview application.

FIG. 13 is a flow chart illustrating job list display processing of the preview application 306 in the second exemplary embodiment.

Step S200 in which the preview application 306 starts processing and the subsequent steps from step S201 to step S207 are similar to those in the flow chart illustrated in FIG. 5.

In a case where the determination is negative (NO in step S203 or in step S205), i.e., in steps S210 to S213 in FIG. 13, the processing is different from that in FIG. 5.

In step S210, the preview application 306 acquires a list of "recently used items" from the OS 112. In step S211, the preview application 306 determines whether a file name close to the job name exists in the list.

FIG. 14 is an example of a data structure of the list of "recently used items."

The application operating on the OS 112 can register the file generated or stored by the application in the "recently used items" via the API.

The list of "recently used items" is managed by the OS 112. The user selects an item from the screen displaying the list to resume the interrupted file editing operation.

The items of the list include information about "number" and "file name." If the number of items reaches a certain number by newly added items, older items are deleted in order.

In the present exemplary embodiment, it is presumed that the preview application 306 receives a print job with a job name of "Image1."

The job name of "Image1" neither starts from the keyword of "http://" nor includes an extension ".*" of a file name, so that the determination in step S203 becomes negative.

Since the print application 301, which specified the job name as "Image 1" may exclude the extension part of the job name from the file name under which printing is performed, it is worth searching if there is a close file name in the list of "recently used items."

In the example table of FIG. 14, items of "Image10.jpeg" of number 2 and "Image1.jpeg" of number 4 include the job name of "Image1" as a partial character string in the file name, it is determined to be close to the job name.

Further, it is determined by a dictionary character-string comparison method between the "Image10.jpeg" of the number 2 and the "Image1.jpeg" of the number 4 that the "Image1.jpeg" of the number 4 is more close to the job name.

The above-described method for searching a close file name is the one that a partial character string search is combined with the dictionary character-string comparison, however, other methods may be used. Any one of them may be used instead of combining them.

If a close file name is found (YES in step S211), the processing proceeds to step S212. Otherwise (NO in step S211), the processing proceeds to step S213.

In step S212, the preview application 306 acquires the icon associated with the close file name determined and acquired in step S211 via the API.

The API called in step S212 is similar to the one called in step S204. The difference between them is that the extracted keyword is specified in step S204, whereas the file name is specified in step S212.

If the icon is thus acquired, in step S206, the preview application 306 displays the job name and the icon acquired in step S212 on the job list. In step S213, the preview application 306 determines the default icon, which is included in the preview application 306, as an icon to be used. As a result, in step S206, the preview application 306 displays the default icon.

In the second exemplary embodiment, there is described the method for acquiring the icon associated with the print job, even if the expected keyword is not included in the job name, and displaying the icon on the job list.

The above-described arrangement enables increasing possibility of display with icons associated with the file name.

In both the first and second exemplary embodiments, the method for acquiring the icon based on the job name by the client PC 10 is described.

However, the job name is information arbitrarily specified by the print application 301, so that there is a possibility that any method described above may not be applicable.

A third exemplary embodiment describes a displaying method in which the client PC 10 displays the icon associated with the print job by acquiring the process name of the print application 301 instead of the job name.

The software components according to the third exemplary embodiment are the configuration module 302 and the preview application 306.

The processing of the configuration module 302 is described below with reference to a flow chart illustrated in FIG. 15.

In step S400, the configuration module 302 receives a request for acquiring a PrintTicket from the print application 301 via the API and then starts PrintTicket generation processing.

In step S401, the configuration module 302 generates a PrintTicket as a base.

In step S402, the configuration module 302 acquires the process name of the print application 301 via the API for which the request for acquiring the PrintTicket has been performed. The processing in step S402 is an example of processing for acquiring the process name.

The process name is an execution file name of the print application 301 including file path information on which the execution file is placed.

In step S403, the configuration module 302 adds information about the process name acquired in step S402 to the PrintTicket generated in step S401 and transmits it to the print application 301. In step S404, the processing is ended.

FIG. 16 illustrates an example of data of the PrintTicket generated in the third exemplary embodiment. As illustrated in FIG. 16, the PrintTicket is print setting information written in the XML format and basically has a document structure specifying a setting value (Option) to a function (Feature).

There is also a document structure for describing print setting information by specification such as a Scored Property and a Parameter as well as a Feature-Option.

In the example of FIG. 16, there are added a function name of a ProcessName which is originally not an instruction of print appearance as well as function names of PageMediaSize and JobInputBin which are information about instruction of print appearance.

The value of "C:\Program Files\Mail\Mail.exe" specified to ProcessName is a process name of the print application 301 acquired by the configuration module 302 in step S402.

The PrintTicket to which information about the process name is thus added is transmitted to the print application 301 and embedded in the XPS print data for the print data.

The print application 301 transmits the XPS print data to the preview filter 305 via the spooler 303 and the pipe line manager 304. The XPS print data is transmitted to the preview application 306.

The description below is for the processing in which the preview application 306 receives the XPS print data and displays the icon associated with information about the print job on the job list with reference to a flow chart illustrated in FIG. 17.

In step S500, the preview application 306 is activated by the preview filter 305 to start processing. In step S501, the preview application 306 receives the XPS of the print job name and the print data from the preview filter 305.

In step S502, the preview application 306 acquires the embedded PrintTicket from the XPS data. In step S503, the preview application 306 further extracts information about the function name of the process name written in the PrintTicket.

In step S504, the preview application 306 determines whether the extracted process name is the one used for a print management module.

If the preview application 306 determines that the extracted process name is not the one used for the print management module (NO in step S504), the processing proceeds to step S505. If the preview application 306 determines that the extracted process name is the one used for the print management module (YES in step S504), the processing proceeds to step S509.

In step S505, the preview application 306 acquires the icon associated with the process name via the API provided by the OS 112. The processing in step S505 is an example of processing for acquiring an object.

In step S506, the preview application 306 determines whether it is successful to acquire the icon. If it is successful (YES in step S506), the processing proceeds to step S507. If it is not successful (NO in step S506), the processing proceeds to step S509.

In step S507, the preview application 306 displays the icon acquired in step S505 and the job name on the job list. In step S508, the preview application 306 generates the preview image from the print data and displays the preview image. In step S510, the processing is ended.

The reason is described below why the default icon is used in a case where the determination is positive in step S504.

Figure 18:
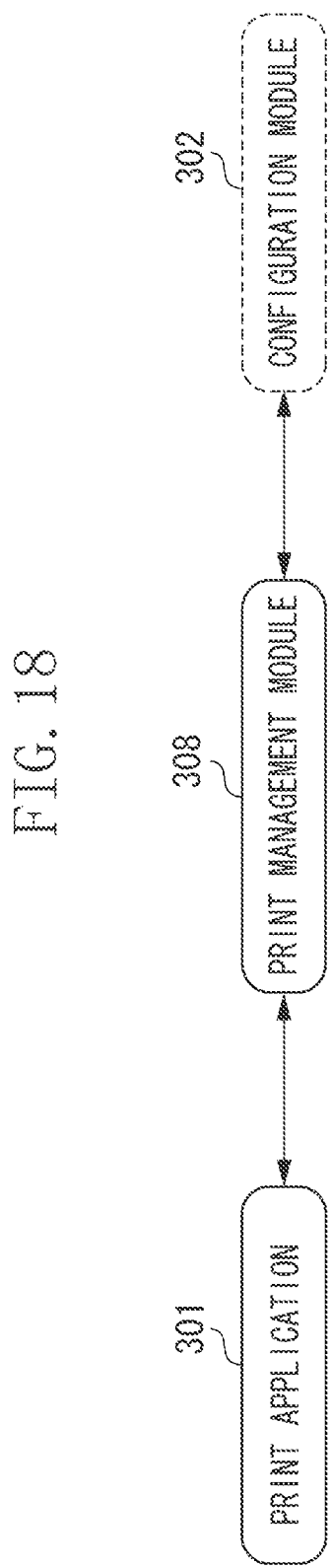
FIG. 18 illustrates an example of software components.

FIG. 18 illustrates an example of software components related to a request for acquiring the PrintTicket.

Figure 15:
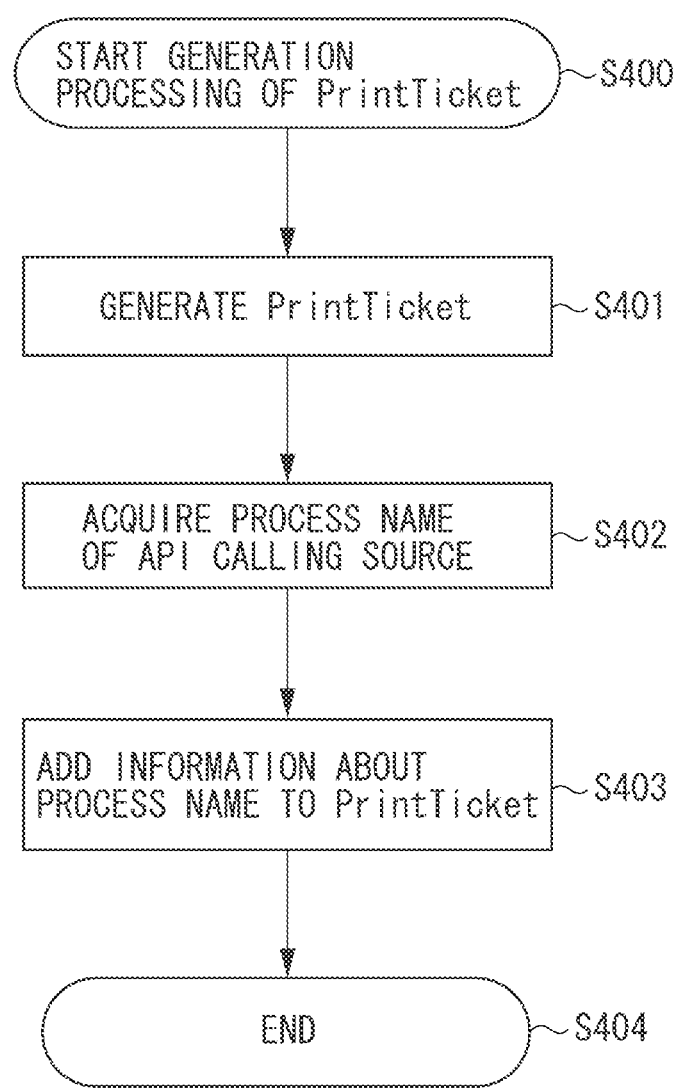
FIG. 15 is a flow chart illustrating an example of processing of a configuration module.

In the above description for the flow chart illustrated in FIG. 15, the print application 301 issues a request for acquiring the PrintTicket via the API, however, a print management module 308 of another process sometimes mediates a request for acquiring the PrintTicket.

To determine whether the request for acquiring a PrintTicket is mediated by the print management module 308 depends on the hardware configuration of the client PC 10 or the setting of the OS 112.

There is a plurality of types in the execution file, i.e., the process name of the print management module 308 (splwow64.exe and printisolationhost.exe, for example). The process name is changed depending on the above configuration or the setting.

Therefore, the configuration module 302 recognizes an acquisition request source for a PrintTicket to be the print management module 308 instead of the print application 301. As a result, the configuration module 302 cannot acquire the information about the print application 301. Consequently, the configuration module 302 cannot describe the information about the print application 301, which is the acquisition request source, to a PrintTicket. Therefore, in step S504, if the configuration module 302 recognizes that the process name is for the print management module 308, the processing proceeds to step S509 because processing in steps S505 and S506 is useless. The preview application 306 previously stores a plurality of process names existing as the print management module 308. If the process name corresponds to any of them in step S504, the processing proceeds to step S509.

In the third exemplary embodiment, the displaying method is described in which the icon is displayed while being associated with the print job by acquiring the process name of the print application 301 instead of the job name.

The present invention can also be realized by executing the following processing. That is, software (program) for realizing the functions of the above exemplary embodiments is supplied to a system or an apparatus via a network or various storage media and a computer (or a CPU or a micro processing unit (MPU)) of the system or the apparatus reads and executes the program.

The above-described arrangement according to the exemplary embodiments improves the visibility between the normal job and the combined job on the user interface of the job list and can provide a user-friendly printing system.

With the above-described arrangement, performing a display control related to a job for a user-friendly display can be achieved as well.

According to the present invention, performing a display control related to a job for a user-friendly display can be achieved.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-050060 filed Mar. 13, 2013, which is hereby incorporated by reference herein in its entirety.

What is claimed is:

1. An information processing apparatus comprising: at least one processor coupled to a memory; a display control unit configured to display a job selection screen, wherein the display control unit displays a first job selection screen that presents a plurality of print jobs, and wherein the plurality of print jobs includes information about a first print job uncombined with information about a second print job; and a generation unit configured to generate a combined print job,
wherein, in response the job selection screen receiving input to select and combine the first and second print jobs, the display control unit displays a second job selection screen in place of the first job selection screen such that information about the first print job and information about the second print job, as uncombined with the first print job, is deleted and information about the combined print job is identifiably displayed in such a manner that the first and second print jobs are included as part of the displayed combined print job,
wherein the display control unit and the generation unit are implemented by the at least one processor,
wherein the first job selection screen includes a first job icon of the first print job and a second job icon of the second print job separately displayed from the first job icon,
wherein, as information about the first and second print jobs that is deleted, the display control unit deletes the first job icon and the second job icon,
wherein the display control unit displays a combined job icon of the combined print job on the second job selection screen in such a manner that the first job icon and the second job icon are each identifiable to a user within the combined job icon as part of the displayed combined print job, and
wherein the first job icon and the second job icon are arranged together side by side to allow the user to visually recognize that two print jobs are combined into the combined print job.

2. The information processing apparatus according to claim 1, wherein the first job selection screen further includes a first job name of the first print job and a second job name of the second print job,
wherein, as information about the first and second print jobs that is deleted, the display control unit deletes the first job name and the second job name, and
wherein the display control unit displays a combined job name of the combined print job on the second job selection screen in such a manner that the first job name and the second job name are each identifiable to a user within the combined job name as part of the displayed combined print job.

3. The information processing apparatus according to claim 1,
wherein the first job selection screen includes a first number of pages of the first print job and a second number of pages of the second print job,
wherein, as information about the first and second print jobs that is deleted, the display control unit deletes the first number of pages and the second number of pages, and
wherein the display control unit displays a combined number of pages of the combined print job on the second job selection screen in such a manner that the first number of pages and the second number of pages are each identifiable to a user within the combined number of pages as part of the displayed combined print job.

4. A method for an information processing apparatus, the method comprising: displaying a job selection screen, wherein a first job selection screen that presents a plurality of print jobs is displayed, and wherein the plurality of print jobs includes information about a first print job uncombined with information about a second print job; and
generating a combined print job,
wherein, in response the job selection screen receiving input to select and combine the first and second print jobs, displaying includes displaying a second job selection screen in place of the first job selection screen such that information about the first print job and information about the second print job, as uncombined with the first print job, is deleted and information about the combined print job is identifiably displayed in such a manner that the first and second print jobs are included as part of the displayed combined print job,
wherein the first job selection screen includes a first job icon of the first print job and a second job icon of the second print job separately displayed from the first job icon, wherein, as information about the first and second print jobs that is deleted, generating includes deleting the first job icon and the second job icon, wherein displaying includes displaying a combined job icon of the combined print job on the second job selection screen in such a manner that the first job icon and the second job icon are each identifiable to a user within the combined job icon as part of the displayed combined print job, and wherein the first job icon and the second job icon are arranged together side by side to allow the user to visually recognize that two print jobs are combined into the combined print job.

5. The method according to claim 4, wherein the first job selection screen further includes a first job name of the first print job and a second job name of the second print job, wherein, as information about the first and second print jobs that is deleted, generating includes deleting the first job name and the second job name, and wherein displaying includes displaying a combined job name of the combined print job on the second job selection screen in such a manner that the first job name and the second job name are each identifiable to a user within the combined job name as part of the displayed combined print job.

6. The method according to claim 4, wherein the first job selection screen includes a first number of pages of the first print job and a second number of pages of the second print job, wherein, as information about the first and second print jobs that is deleted, generating includes deleting the first number of pages and the second number of pages, and wherein displaying includes displaying a combined number of pages of the combined print job on the second job selection screen in such a manner that the first number of pages and the second number of pages are each identifiable to a user within the combined number of pages as part of the displayed combined print job.

7. A non-transitory computer-readable storage medium storing a program to cause an information processing apparatus to execute a method for performing control, the method comprising:

displaying a job selection screen, wherein a first job selection screen that presents a plurality of print jobs is displayed, and wherein the plurality of print jobs includes information about a first print job uncombined with information about a second print job; and generating a combined print job, wherein, in response the job selection screen receiving input to select and combine the first and second print jobs, displaying includes displaying a second job selection screen in place of the first job selection screen such that information about the first print job and information about the second print job, as uncombined with the first print job, is deleted and information about the combined print job is identifiably displayed in such a manner that the first and second print jobs are included as part of the displayed combined print job, wherein the first job selection screen includes a first job icon of the first print job and a second job icon of the second print job separately displayed from the first job icon, wherein, as information about the first and second print jobs that is deleted, generating includes deleting the first job icon and the second job icon, wherein displaying includes displaying a combined job icon of the combined print job on the second job selection screen in such a manner that the first job icon and the second job icon are each identifiable to a user within the combined job icon as part of the displayed combined print job, and wherein the first job icon and the second job icon are arranged together side by side to allow the user to visually recognize that two print jobs are combined into the combined print job.

8. The non-transitory computer-readable storage medium according to claim 7, wherein the first job selection screen further includes a first job name of the first print job and a second job name of the second print job, wherein, as information about the first and second print jobs that is deleted, generating includes deleting the first job name and the second job name, and wherein displaying includes displaying a combined job name of the combined print job on the second job selection screen in such a manner that the first job name and the second job name are each identifiable to a user within the combined job name as part of the displayed combined print job.

9. The non-transitory computer-readable storage medium according to claim 7, wherein the first job selection screen includes a first number of pages of the first print job and a second number of pages of the second print job, wherein, as information about the first and second print jobs that is deleted, generating includes deleting the first number of pages and the second number of pages, and wherein displaying includes displaying a combined number of pages of the combined print job on the second job selection screen in such a manner that the first number of pages and the second number of pages are each identifiable to a user within the combined number of pages as part of the displayed combined print job.

* * * * *